US005873800A

United States Patent [19]
Maslow et al.

[11] Patent Number: 5,873,800
[45] Date of Patent: Feb. 23, 1999

[54] VARIABLE OUTPUT SPEED DRIVE

[75] Inventors: James E. Maslow, Lexington; Frank A. Folino, Weston; Stuart E. Schechter, Newton, all of Mass.

[73] Assignee: Synkinetics, Inc., Lowell, Mass.

[21] Appl. No.: 979,875

[22] Filed: Nov. 26, 1997

Related U.S. Application Data

[63] Continuation of Ser. No. 372,594, Jan. 13, 1995, and a continuation-in-part of Ser. No. 76,010, Jun. 11, 1993, abandoned, and Ser. No. 259,228, Jun. 13, 1994, Pat. No. 5,607,370.

[51] Int. Cl.$^6$ ................................................ F16H 15/26
[52] U.S. Cl. ................................ 476/38; 475/5; 475/104
[58] Field of Search ............................. 475/5, 91, 149, 475/151, 104, 196, 153; 476/36, 38

[56] References Cited

U.S. PATENT DOCUMENTS

| | | | |
|---|---|---|---|
| 900,598 | 10/1908 | Schnermann | 74/424.8 VA |
| 1,568,290 | 1/1926 | Morison | 74/25 |
| 1,681,762 | 8/1928 | Connet | 74/424.8 VA |
| 2,276,908 | 3/1942 | Schmid | 475/104 |
| 2,512,272 | 6/1950 | Gull | 74/63 |
| 2,565,828 | 8/1951 | Vivie . | |
| 2,571,172 | 10/1951 | Robin et al. | 475/5 |
| 3,039,324 | 6/1962 | Waterfield | 74/63 X |
| 3,049,019 | 8/1962 | Lapointe et al. | 476/36 |
| 3,278,155 | 10/1966 | Jehn . | |
| 3,319,925 | 5/1967 | Kojima et al. | 74/424.8 VA |

(List continued on next page.)

FOREIGN PATENT DOCUMENTS

| | | |
|---|---|---|
| 24020 | 2/1922 | France . |
| 1021945 | 2/1953 | France . |
| 59-133863 | 8/1984 | Japan . |
| 59-180153 | 10/1984 | Japan . |
| 60-4663 | 1/1985 | Japan . |
| 60-129462 | 7/1985 | Japan . |
| 60-146954 | 8/1985 | Japan . |
| 60-168954 | 9/1985 | Japan . |
| 60-179563 | 9/1985 | Japan . |
| 64-0072449 | 3/1989 | Japan . |
| 2253037 | 10/1990 | Japan . |
| 4-185939 | 7/1992 | Japan . |

(List continued on next page.)

OTHER PUBLICATIONS

Abstract, Japan, 2 Patent Apl. #2–314915 Jul. 2, 1992 4–185939(A).
Abstract, Japan, Patent, 60–146954 (A) Aug. 2, 1985.
Abstract, Japan, Patent, 60–4663 (A) Jan. 11, 1985.
Abstract, Japan, Patent, 60–179563 (A) Sep. 13, 1985.
Abstract, Japan, Patent, 60–129462 (A) Jul. 10, 1985.
Abstract, Japan, Patent, JP890072449 Mar. 24 1989.
"Balls Reduce Speed and Transmit Torque", *Mechanical Engineering & Technology Guide,*; publ. prior to Mar. 14, 1991.
Dojen™ Precision Rotary Actuator Designer's Guide (Dir. of Lenze, Woburn, MA), published prior to Mar. 14, 1991.
"General Information on Sinusoidal Ball Drives", *Soviet Engineering Research*, vol. 6 (1986) Feb., No. 2 @pp. 23–26, Mowbray, Leichestershire G.B. (also referenced as *Sov. Engineering Research*, V. Mashinostroeniya, Jun. 1986, Issue 2, pp. 24–28).

*Primary Examiner*—Khoi Q. Ta
*Attorney, Agent, or Firm*—James E. Maslow

[57] ABSTRACT

Methods and apparatus for translating angular velocity and rotary motive force of an input drive to angular velocity and rotary motive force of an output drive, by providing a pair of devices rotatable at, relative to or about a common axis, and translating means for transmitting angular velocity and rotary motive force of a first of the devices to angular velocity and rotary motive force of a second of the devices. In a preferred embodiment, the translating means includes a variably and controlledly groundable reaction disk for varying the throughput from the input to the output.

28 Claims, 5 Drawing Sheets

U.S. PATENT DOCUMENTS

| Patent # | Date | Name | Class |
|---|---|---|---|
| 3,424,018 | 1/1969 | Alsch | 476/38 |
| 3,468,175 | 9/1969 | Rabek | 74/63 |
| 3,477,693 | 11/1969 | Benzanis . | |
| 3,673,979 | 7/1972 | Kunuu | 116/285 |
| 3,807,243 | 4/1974 | Yada | 74/63 |
| 3,852,998 | 12/1974 | Leeson | 74/63 |
| 4,241,897 | 12/1980 | Maezawa | 74/424.8 VA |
| 4,477,054 | 10/1984 | Danby et al. | 251/122 |
| 4,507,959 | 4/1985 | Brazener | 73/182 |
| 4,584,904 | 4/1986 | Distin, Jr. et al. | 74/63 |
| 4,643,047 | 2/1987 | Distin et al. | 74/63 |
| 4,893,582 | 1/1990 | Kalamon et al. | 74/424.8 VA |
| 4,930,746 | 6/1990 | Reinicke et al. | 251/129.11 |
| 4,960,003 | 10/1990 | Hartley | 74/63 |
| 4,973,295 | 11/1990 | Lee | 475/153 |
| 5,016,487 | 5/1991 | Bollmann | 476/36 |
| 5,312,306 | 5/1994 | Folino | 475/196 |
| 5,321,988 | 6/1994 | Follino | 74/25 |
| 5,425,682 | 6/1995 | Hayashi | 475/5 |
| 5,514,045 | 5/1996 | Folino | 476/36 |
| 5,562,564 | 10/1996 | Folino | 476/36 |
| 5,600,999 | 2/1997 | Folino | 74/122 |
| 5,607,370 | 3/1997 | Maslow et al. | 475/196 |

FOREIGN PATENT DOCUMENTS

| Patent # | Date | Country | Class |
|---|---|---|---|
| 1206528 | 4/1978 | U.S.S.R. . | |
| 629387 | 9/1978 | U.S.S.R. . | |
| 1257331 | 9/1986 | U.S.S.R. . | |
| 1399548 | 12/1986 | U.S.S.R. . | |
| 1368545 | 1/1988 | U.S.S.R. . | |
| 1618940 | 1/1989 | U.S.S.R. . | |
| 1490362 | 6/1989 | U.S.S.R. . | |
| 1754990 | 4/1990 | U.S.S.R. . | |
| 1569470 | 6/1990 | U.S.S.R. . | |
| 710543 | 6/1952 | United Kingdom . | |
| WO 92/16775 | 10/1992 | WIPO | F16H 25/06 |
| WO 94/18472 | 8/1994 | WIPO | F16H 1/34 |
| WO 94/29617 | 12/1994 | WIPO | F16H 15/08 |

VARIABLE OUTPUT SPEED DRIVE

BACKGROUND OF THE INVENTION

This application is a continuation of U.S. patent application of U.S. patent application Ser. No. 08/372,594, filed Jan. 13, 1995, entitled VARIABLE OUTPUT SPEED DRIVE, incorporated herein by reference; and a continuation-in-part of continuation-in-part of U.S. patent application Ser. No. 08/076,010, filed Jun. 11, 1993, entitled: HIGH EFFICIENCY VARIABLE OUTPUT SPEED CONVERTER incorporated herein by reference, and now abandoned, and U.S. patent application Ser. No. 08/259,228, filed Jun. 13, 1994, entitled: VARIABLE OUTPUT SPEED CONVERTER, incorporated herein by reference and now U.S. Pat. No. 5,607,370.

The present invention relates to mechanical power transmissions, and more particularly, to speed reducers and the like for use between a drive and driven shaft.

Speed conversion is an important capability in the efficient utilization of rotary motive force. The occasion often arises for reducing the speed of a drive member to a lower speed and higher torque at a driven member. In automobiles, for example, a hydraulic transmission, with various combinations of gear assemblies, accomplishes the task of translating the high rotary speed of the gasoline engine to the lower rotational requirements at the driven axle. Typically, such transmissions are quite complex, requiring many parts to operate in sophisticated syncopation, and are quite labor intensive for both assembly and service.

It is therefore an object of the present invention to provide a speed converter which is simplified in nature, highly efficient, and is robust in transmission capability.

It is yet another object of the present invention to provide speed converter which requires few moving parts and having high operational and volumetric efficiency.

It is a further object of the present invention to provide a transmission which is relatively easy to assemble and service.

It is yet an additional object of the present invention to provide optimized load sharing among the multi-elements that transmit the rotary motive force in a speed converter.

It is yet another object of the present invention to provide a high efficiency seamlessly shifting, variable speed converter for use as a vehicular transmission in a vehicle driven by an electric motor or by an internal combustion engine and operating at variable or constant speed.

SUMMARY OF THE INVENTION

In one illustrative embodiment, a motor vehicle transmission comprises a pair of cam devices rotatable about a common axis cooperating via translating means. This translating means transmits angular velocity and rotary motive force of a first of the devices (i.e., input) to angular velocity and rotary motive force of a second of the devices (i.e., output). The translating means includes a reaction disk having at least one slot (radial or axial depending upon the embodiment) for oscillation of an interacting element in the slot, the reaction disk being located with the conjugate pair about the common axis, wherein the interacting element couples the first device to the second device. As a result, the angular velocity and rotary motive force of the first device (input) is efficiently translated by the translating means into the angular velocity and rotary motive force of the second device (output).

In a preferred embodiment of the invention, the speed converter comprises, firstly, an input disk mounted on an input shaft, wherein the disk has a face that extends radially perpendicular to the shaft. This face contains a grooved cam track forming a drive cam track. The drive cam track, in simplest form, has one cycle starting at a base circle radius and proceeding rotatably about the center of the disk and shaft at a constantly increasing radius and at a constant angular rotation to a maximum radius at 180°, i.e., in the rise mode, and then proceeding rotatably in the fall mode at a decreasing radius of the same rate and constant angular rotation as in the rise mode back to the original base circle radius, completing 360° of rotation.

Next, the speed converter comprises an output disk mounted on an output shaft, wherein the disk has a face that extends radially perpendicular to the shaft. This face has a grooved cam track for forming a driven cam track, and which is mounted along the shaft in a position facing the face cam track of the drive cam. This driven face cam contains a plurality of rise and fall modes that are selected to achieve a desired speed conversion, which in this case is in ratio with the single cycle of the drive cam. Each rise and fall mode of the plurality of cycles in the driven cam are configured to have the same radial displacement, for uniform conversion.

In this preferred embodiment, the speed converter includes a reaction disk having a plurality of slots for respective receipt of respective transmission elements (i.e., balls), all within a common housing. The invention produces constant velocity for 360 degrees rotation at the output, with torque transmission through each of the transmission elements for 360 degrees of rotation at the output. All of the transmission elements share the load continuously, thereby decreasing the unit load on each transmission element.

In a speed reverser embodiment of the invention, the drive cam, reaction disk and driven cam are still required, although with variation of the cam curvature and ball geometry. Thus it is possible to interchange a reverse motion drive cam for the drive cam of the above speed reducer.

In a particular embodiment of the invention, a seamlessly-shifting variable-speed transmission is taught in which the reaction disk acts as a splitter/modulation device. The reaction disk has an outer circumference configured with a coupling arrangement, such as gear teeth. A corresponding coupling, such as a gear, is provided on the shaft of a controller device coupled to the outer circumference of the reaction disk. When the controller device is at a stand still, it grounds the reaction disk and all torque throughput is taken out at the speed reducer output. As the controller device permits rotation of the reaction disk it varies the degree of grounding of the reaction disk and as a result splits off some of the speed reducer input via the reaction disk, the speed converter output being reduced accordingly. Thus as the reaction disk rotation is modulated, the effective speed converter output modulates accordingly.

In a further embodiment, a seamlessly-shifting wide range transmission is provided having a primary drive loop and a high speed loop. Computer (e.g., a microcomputer or microprocessor) controlled controllers vary the degree of grounding of the associated reaction disks for accommodation of higher and lower torque demands. These demands reflect momentary conditions and changes thereof, such as acceleration, deceleration, and coasting.

One embodiment of this system preferably is provided with an energy recapture function. In this recapture function, a capture device, such as a "generator" (e.g., a generator, alternator, compressor, pump, or the like), captures and harnesses the energy outputted via the reaction disk and uses or stores it accordingly. The generator output thus can be stored for later use, so as to obtain optimal operating efficiency. This optimization comes from the fact that the generator is operated with otherwise lost energy, and only as optimally delivered under computer control.

This computer-regulated system enables running the conventional auxiliary power systems, such as for electrical power, braking and power steering, using rotary energy available at the reaction disks. This energy can be increased or decreased as such load requires. Hence recaptured energy at the reaction disk is stored or used efficiently, and can be increased or decreased as needed. This will yield optimal fuel efficiency.

The present cam invention provides a highly efficient replacement for gear type transmissions. In the prior art gear assemblies, as the commonplace gears turn, they interact with each other by their teeth, essentially one tooth at a time. As these teeth engage, frictional losses occur as the tooth surfaces rub and slide against each other. Also, driving with single teeth puts all of the effort and stress on those single teeth, and these teeth can bend and break, meanwhile the other teeth are not utilized at all. Only using one or a few teeth at a time makes conventional gears inherently inefficient.

Meanwhile, the disclosed preferred cam devices minimize frictional loss and inefficiency, while maximizing torque throughput. In the preferred embodiments, these cam devices obtain highly efficient speed conversion because all of the cycles ("teeth") of the cams work together simultaneously and synchronously (not one tooth at a time as in gears). As a result of this simultaneous synchronous action, such transmissions are inherently more efficient than the gear assemblies they are intended to replace.

Furthermore, the flatness of these cam disk devices permits fabrication out of space-aged materials, such as ceramics and epoxies, in addition to conventional materials. Thus these cam devices are inherently more efficient and can operate at higher temperatures with longer operating life compared to convention gears made with conventional materials.

The high volumetric and operational efficiency of the present invention has many benefits in energy and performance-conscious applications. And the seamlessly-shifting and variable feature of the transmission disclosed herein will yield improved user comfort.

A preferred coaxial, in-line embodiment of the invention has an input drive source (e.g., an electric motor) coupled to a primary input shaft which rotates primary drive cam. The rotating cam drives balls radially in a first set of radial slots of reaction disk, and these balls in turn drive secondary driven cam, which in turn rotates the output shaft.

A control drive source (e.g., an electric motor) rotates control drive cam. The rotating cam drives balls radially in a second set of radial slots of the reaction disk, and these balls in turn are reacted by the secondary cam which is fixed to the local ground, and the drive motor is mounted to the local ground.

The reaction disk is rotatably mounted on the input shaft. When the control motor is at rest, the reaction disk is grounded via the balls between grounded secondary cam 222 and the at rest primary control cam 216, the angle of attack of the balls to the primary control cam being essentially perpendicular and therefore cannot create a rotary tangential force adequate to backdrive the motor. Therefore, essentially all of the input rotation of primary drive cam will be converted to rotation of the output secondary cam, at the appropriate speed reduction, because the grounded reaction disk cannot be backdriven and is fixed in space. As well, the control motor therefore does not have to react the torque on the reaction disk from the primary drive. Grounding of the reaction disk is necessary to oppose its tendency to rotate (if unconstrained) in view of the torque which it is reacting.

When the control motor is energized and begins to rotate, the reaction disk begins to rotate at the speed reduction dictated by the relationship of the cams, which lessen the constraints against reaction disk rotation, since the balls begin to drive in the slots which in turn drives the reaction disk in a rotary motion. And this direction is consistent with the tendency of the reaction disk to rotate. Therefore the reaction disk will rotate as permitted by rotation of the control motor, even though the rotating control motor does not have to react the torque on the rotating reaction disk because the reaction disk is not backdriveable into the control motor.

The present invention preferably incorporates the teachings of U.S. patent application Ser. No. 670,263, filed Mar. 14, 1991, entitled: SPEED CONVERTER, incorporated herein by reference, and PCT Patent Application Serial No. PCT/US92/02023, filed Mar. 13, 1992, entitled: SPEED CONVERTER, incorporated herein by reference. In such disclosures, the drive cam has at least one cycle and the driven cam has a plurality of cycles, wherein the angle G separating the slots must be greater than the angle r subtended by each of the driven cam cycles, for decreasing speed at the output. The minimum angle G is computed as $$G = \frac{360}{\text{no. of cycles in driven cam} - \text{no. of cycles in drive cam}}$$

Or the angle G (or gamma) separating the ball slots must be less than the angle r (or theta) subtended by each of the drive cam cycles, for increasing speed at the output.

BRIEF DESCRIPTION OF THE DRAWINGS

These and other features and advantages of the present invention will be more fully understood by reference to the following detailed description in conjunction with the attached drawing in which like reference numerals refer to like elements and in which.

DETAILED DESCRIPTION OF A PREFERRED EMBODIMENT

Figure 1:
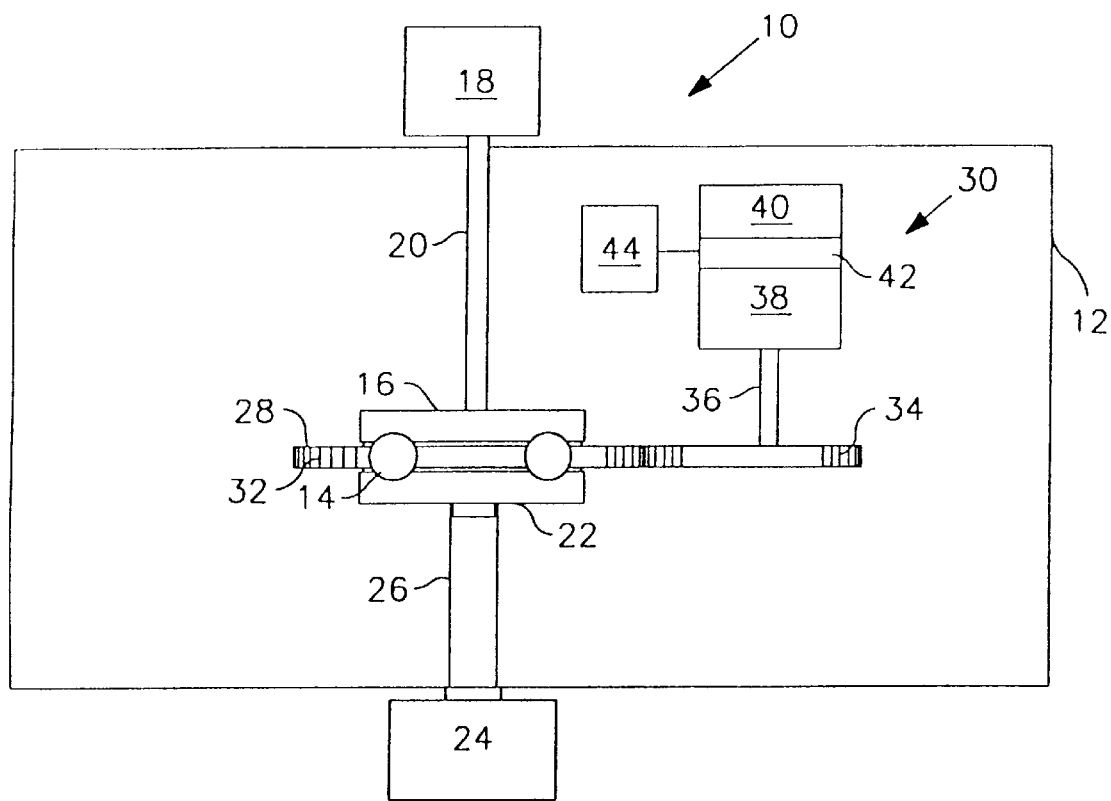
FIG. 1 is a schematic view of an variable speed automotive transmission embodiment of the invention.

A single-stage embodiment of the present invention is shown in FIG. 1 as part of a motor vehicle. Variable speed reducer assembly 10 includes a housing 12, a plurality of interacting elements (e.g., balls 14), a drive cam member 16 coupled to a rotary input source 18 (e.g., an engine or motor) via input shaft 20, and a driven cam member 22 coupled to the wheels 24 of the vehicle via output shaft 26. A slotted reaction disk 28 is coupled to housing 12 via control assembly 30. The drive member is mounted in housing 12 by means of an input bearing or bushing and the driven member is mounted in housing 12 by means of an output bearing or bushing. Preferably the drive member and the driven member are each symmetrical about the drive axis A.

Figure 2:
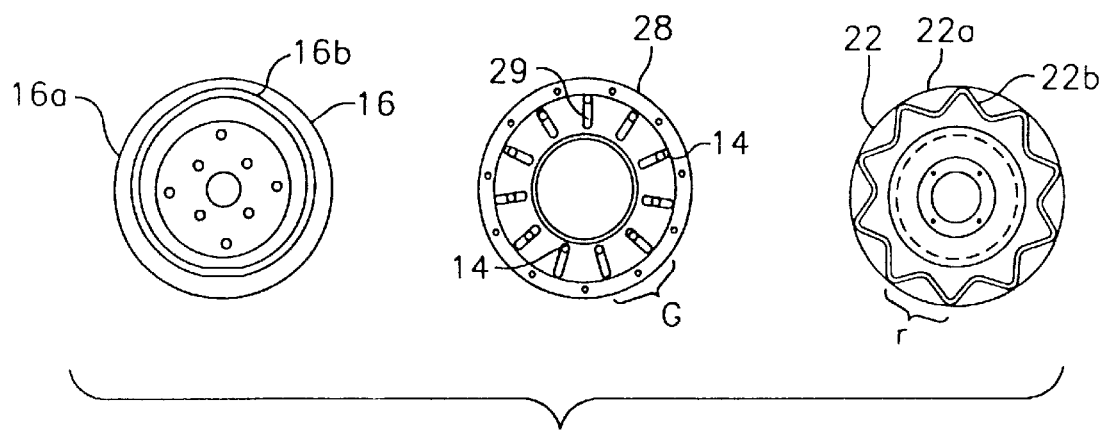
FIG. 2 shows the basic elements of the speed reducer of the invention.

The basic components of a 12:1 speed reducer are shown in FIG. 2, wherein the drive cam member 16 includes a drive cam disk 16a with a single cycle drive cam track 16b formed in the face thereof; and the multi-cycle driven cam member 22 includes a driven cam disk 22a with a multi-cycle driven cam track 22b formed in the face thereof. The balls 14 oscillate in slots 29 of the slotted reaction disk 28 as the balls are driven by the rotating drive cam track 16b, and these oscillating balls, by their cooperation with the flanks of the multi-cycle driven cam track 22b, rotate the driven cam disk 22a with a reduction ratio based on the number of cycles of the driven cam member to the number of cycles of the drive cam member.

In the preferred embodiment, all cams of the invention cooperate as conjugate pairs. Each pair is considered to be conjugate because they must satisfy the condition that all of the balls travel at the same constant velocity all of the time, uniformly and simultaneously, except for the moment of each ball's change of direction in the slot. The slot is longer than the anticipated ball travel and therefor does not effect this change of direction. The cams are also configured such that at this change of direction, each ball is essentially unloaded, thus reducing frictional losses. The ideal maximum number of balls is determined as one fewer than the number of cycles on the driven cam. The number of slots on the reaction disk is selected accordingly. The number of cycles on the drive and driven cams are selected according to the desired speed conversion ratio. The illustrative ratio shown herein is 12:1, but any number of cycles can be chosen so as to obtain any desired ratio.

A controller assembly 30 is provided for control of the reaction disk to obtain an angular velocity at a controllable and variable rate. This removes energy form the speed converter and thus provides speed conversion at a controllable and variable rate at the speed reducer output. Thus, where the reaction disk is grounded or immobilized, the speed reducer output is constant and where the grounding of the reaction disk is varied or modulated, then the speed reducer output is varied accordingly.

By modulating the angular velocity of the reaction disk, a seamlessly-shifting variable speed transmission is provided. As a result, the power input to the speed converter (e.g., a gasoline engine or an electric motor) can operate at its optimum speed, and the speed of travel of the vehicle can be governed by modulating the angular velocity of the reaction disk.

In this embodiment, the reaction disk has a toothed circumference 32, such as might form a spur gear. By means of gear 32 and is coupled to the toothed coupling 34 (such as might form a cooperating spur gear) on the end of shaft 36 coupled to an electric control motor 38 of control assembly 30. Control assembly 30 also includes a microprocessor/driver circuit 40 for control of motor 38. The operator simply varies the speed of the control motor to control the angular velocity of the reaction disk so as to regulate the delivery of the speed converter input from engine 18 to the speed converter output 22 (coupled to the vehicle's wheels 24), and thus to control the speed of the vehicle. The control motor 38 on the reaction disk can thus be driven in one direction to oppose rotation of the reaction disk, i.e., to ground it, or in the other direction to accelerate rotation of the reaction disk, according to the desired vehicular speed.

Preferably the control motor 38 is provided with a second set of windings 42 so that when the motor is undriven and "freewheeling", it can act as a generator to capture the rotary energy being bled from the system via the reaction disk. Alternatively, a stand-alone generator can be used for this energy recapture function. The generator is coupled to a battery 44 for storage of the recaptured energy.

Figure 3:
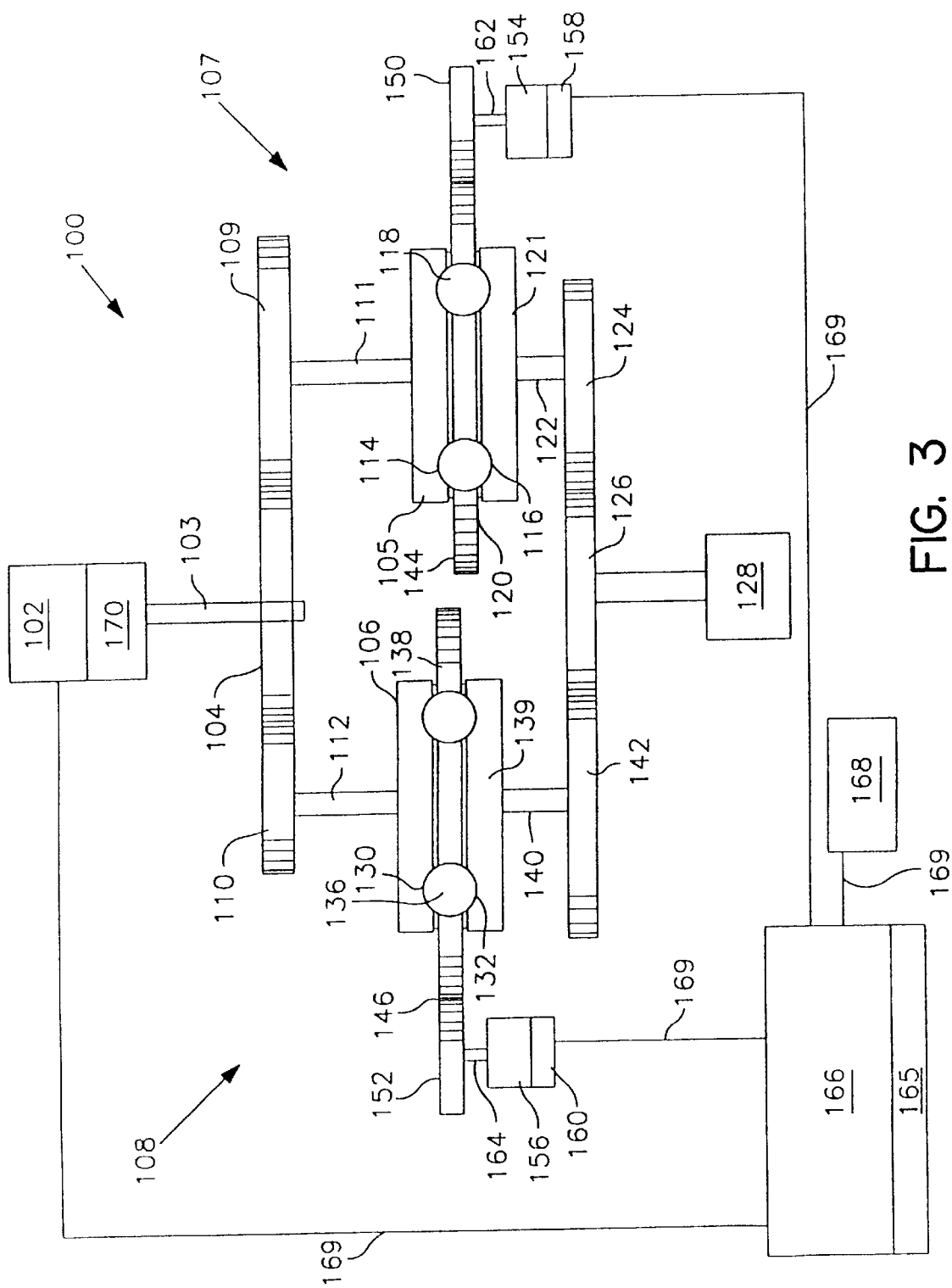
FIG. 3 is a schematic view of a seamlessly-shifting, variable speed vehicular transmission with high speed mode according to the invention.
Figure 4:
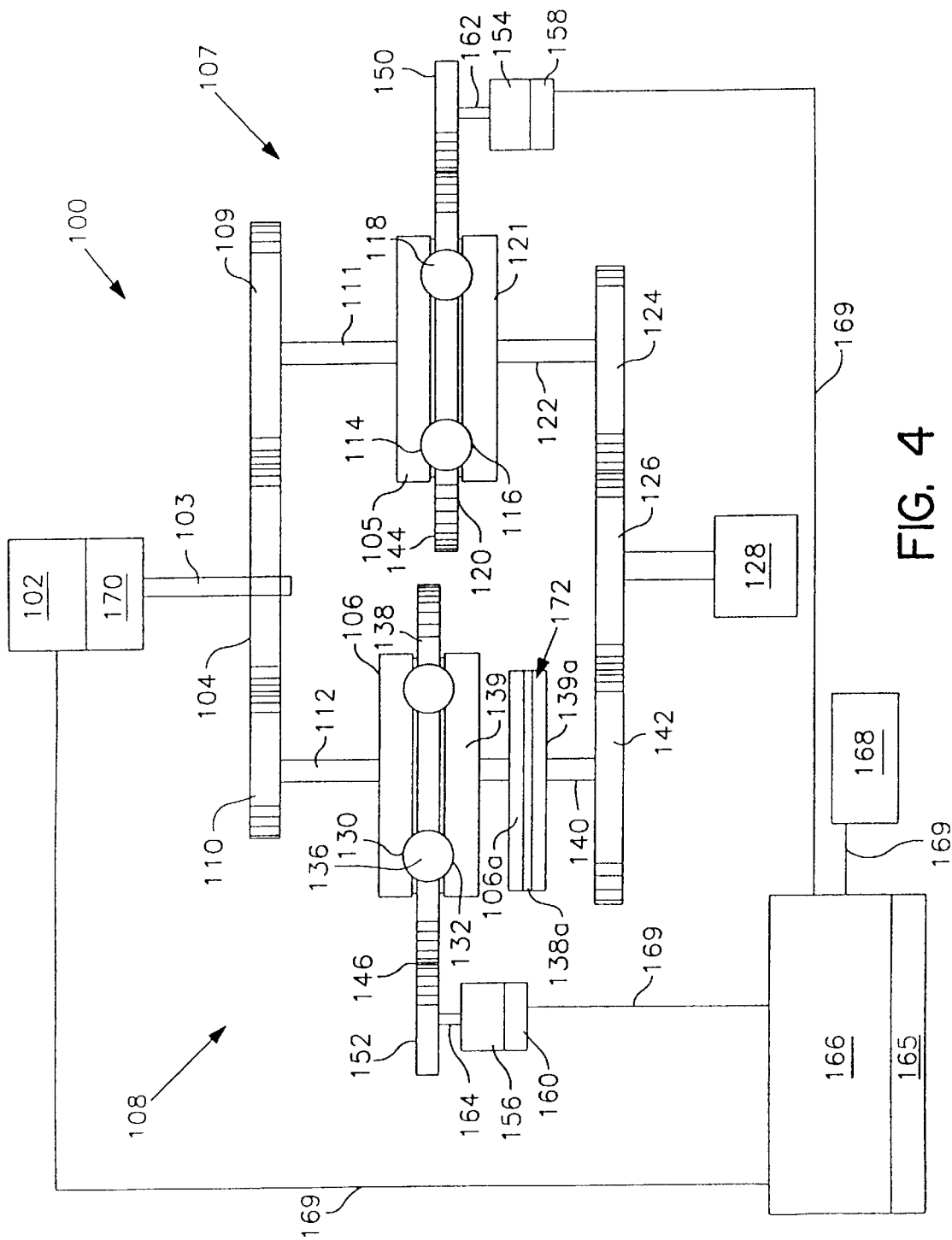
FIG. 4 is a multi-stage embodiment of the invention of FIG. 3.

Turning to FIG. 3, a seamlessly variable vehicular transmission 100 with high speed mode is shown according to an alternative practice of the invention. A motor or engine 102 is coupled via shaft 103 and gear 104 to the input disks 105, 106 of variable speed reducer assemblies 107, 108 via respective gears 109, 110 and shafts 111, 112. (Alternatively, these gears 109, 110 are formed on the back of the input cam disks 105, 106.)

Variable speed reducer assembly 107 comprises an input drive cam track 114 on the face of drive cam disk 105 and an output driven cam track 116 on the face of driven can disk 121, interacted by balls 120 which travel in the slots (see slots shown in FIG. 2) of reaction disk 120. The output at driven cam disk 121 is coupled via shaft 122 to gear 124, which is coupled via cooperating gear 126 ultimately to the wheels 128 of the vehicle.

The other variable speed reducer assembly 108 also comprises an input drive cam track 130 and an output driven cam track 132 interacted by balls 136 which travel in the slots (described earlier) of reaction disk 138. The output from the driven disk 139 is coupled via shaft 140 to gear 142, which is coupled via cooperating gear 126 ultimately to the wheels 128 of the vehicle.

Speed reducer assembly 107 is designed to obtain a low speed reduction, and includes the cooperating gears 104, 109, 124 and 126 and the cooperating cam tracks 114, 116. This is a low torque high speed loop which acts as a high speed section of the transmission.

Speed reducer assembly 108 is designed to obtain a high speed reduction, and includes the cooperating gears 104, 110, 142 and 126 and the cooperating cam tracks 130, 132. This is a high torque, lower speed loop which acts as the primary drive section of the transmission.

Both of these primary and high speed mode sections cooperate interactively and seamlessly for continuous regulation of the output drive to the wheels 128. This is achieved wherein reaction disks 120, 138 are selectively grounded to the equipment housing via their respective peripheral circumferential gear contours 144, 146, and a respective gear 150, 152 of a respective controller device 154, 156.

The controller devices 154, 156, and the motor/engine 102 operate under the control of computer/processor 166. The computer also responds to inputs from accelerator, ignition, speedometer and brake circuits 168, all via conductors 169. This control function is based upon the realization that when a reaction disk is ungrounded, there is no appreciable transmission of rotary input to the loaded speed reducer output. Thus, for example, when reaction disk 138 is entirely grounded and reaction disk 120 is ungrounded (e.g., freewheeling), all available rotary throughput is conveyed through speed reducer assembly 108 toward the wheels. Likewise, when reaction disk 120 is entirely grounded and reaction disk 138 is ungrounded, all available rotary throughput is conveyed through speed reducer assembly 107 toward the wheels.

The control function described herein is based upon the realization that when a reaction disk is ungrounded, there is no appreciable transmission of rotary input to the loaded speed reducer output. Thus, for example, when reaction disk 138 is entirely grounded and reaction disk 120 is ungrounded (e.g., freewheeling), all available rotary throughput is conveyed through speed reducer assembly 108 toward the wheels. Likewise, when reaction disk 120 is entirely grounded and reaction disk 138 is ungrounded, all available rotary throughput is conveyed through speed reducer assembly 107 toward the wheels.

Preferably controller devices 154, 156 are electric motors, such as described above. Most preferably a generator device or winding 158, 160 is coupled to the shaft 162, 164 of such motors, and these generators are coupled to a battery or other capture device 165 for recapture of rotary energy at the ungrounded reaction disks. Given this recapture ability, all of the vehicle's generator devices (e.g., generator, alternator, air conditioning compressor, power steering and power brake pumps, or the like), can be run on recaptured energy governed by their demand cycles and the demand of the vehicle speed, and optimally controlled by the computer.

In use, rotary input source 102 may be a constant or a variable speed source, turbo, diesel, or conventional, engine or motor, whether electric, pressurized or internal combustion.) In any event, input 102 supplies a rotary input to both speed reducers 107 and 108. Assuming a clockwise rotary input from engine 102, both speed reducer inputs will be driven counterclockwise via gears 109, 110, which motion in turn is ultimately delivered to output gear 126, for supplying clockwise drive to the wheels. Accordingly, when the vehicle is at rest, and then the engine is engaged and the accelerator is depressed, reaction disk 120 of reducer assembly 107 is driven clockwise or at least allowed to freewheel clockwise, under control of controller 154 as instructed by computer 166; at the same time reaction disk 138 of reducer assembly 108 is grounded by its controller 156, so that the engine drive input energy at gears 104 and 110 is applied to wheels 128 via speed reducer assembly 108 and gears 142, 126.

At the same time, the output of speed reducer assembly 108 is also coupled at the same time via gear 126 to the output gear 124 of speed reducer assembly 107. Gear 124 will thus be driven counterclockwise thereby, which will act through driven cam disk 121 as an input to speed reducer 107 and will drive the clockwise-turning, ungrounded or freewheeling reaction disk 120 clockwise according to the difference between the angular velocity of the counterclockwise driven drive and driven cams 105, 121. The thus driven reaction disk 120 is coupled via gears 144 and 150 to generator 158 for recapture of the lost rotary energy thereat for storage, such as in battery 165, so as to obtain maximum operating efficiency. A like arrangement occurs when reaction disk 120 is grounded and the ungrounded reaction disk 138 is driven by output 139 of speed reducer assembly 108, via gears 124, 126, 142.

As the vehicle approaches operating speed, the driver relaxes on the accelerator, and the computer begins to enter into a speed maintenance mode. In this mode, the reaction disks 120, 138 are controlled so as to apply the maximum drive input energy to the high speed mode speed reducer assembly 107. This is done by partly or fully grounding reaction disk 120 of assembly 107, via control of controller 154, while partly or fully releasing reaction disk 138 of reducer assembly 108 via control of controller 156. Computer 166 continuously polls the controllers, engine 102, and the accelerator, ignition, battery, speedometer and brake circuits 168, and directs action of the transmission and engine accordingly. The generators 158, 160 recapture lost energy at the rotating reaction disks, accordingly.

As will be appreciated by a person skilled in the art, the controller devices 154, 156, and the motor/engine 102 operate under the control of computer/processor 166. This computer/processor is conventional. The computer responds to inputs from accelerator, ignition, speedometer and brake circuits 168, all via conductors 169. This is analogous to the closed loop control system of conventional "cruise control" systems on many motor vehicles.

For illustrative purposes the speed reduction of the high speed mode speed reducer assembly 107 might be 1:1, while for the primary reducer assembly 108 it might be 6:1. Assuming that reaction disk 120 is freewheeling and that reaction disk 138 is fully grounded, a 2500 RPM input might result in perhaps about 40 MPH. If reaction disk 108 were slowly ungrounded, this wheel speed would be reduced accordingly down to zero, again assuming that reaction disk 120 is freewheeling.

As reaction disk 138 approaches being fully grounded, and the vehicle is traveling at a desired speed, then the computer can begin to transfer the transmission function to the high speed mode reducer assembly 107 by beginning to ground reaction disk 120 and beginning to unground reaction disk 138 by degrees, under control of computer 166. When reaction disk 120 is fully grounded and reaction disk 138 is ungrounded, then the transmission is in full high speed mode. Assuming the 2500 RPM input, and 1:1 speed reduction for reducer assembly 107, this would result in a much increased speed at the wheels. Also, the engine speed could be increased or reduced accordingly, or both reaction disks could be permitted to rotate as determined by the computer while charging battery 165, even without changing engine speed, all under computer control. A conventional controller circuit would be used to perform this regulation function as will be appreciated by a person skilled in the art of controller theory and applications.

A reverser assembly 170 is further provided for putting the vehicle in reverse. This may be provided in an arrangement in which the drive cam, reaction disk and driven cam are still used, although with variation of the cam curvature and ball geometry. Thus it is possible to engage a reverse motion drive selectively as needed according to the invention via an appropriate clutching/shunting arrangement.

The above embodiment has a primary and a high speed mode drive loop. Additional loops can be added for greater efficiency in changing from one to another speed reduction. Also, several speed reduction stages can be mated to obtain greater speed reduction. The seamlessly-shifting aspect of the invention still obtains in these embodiments.

Figure 5:
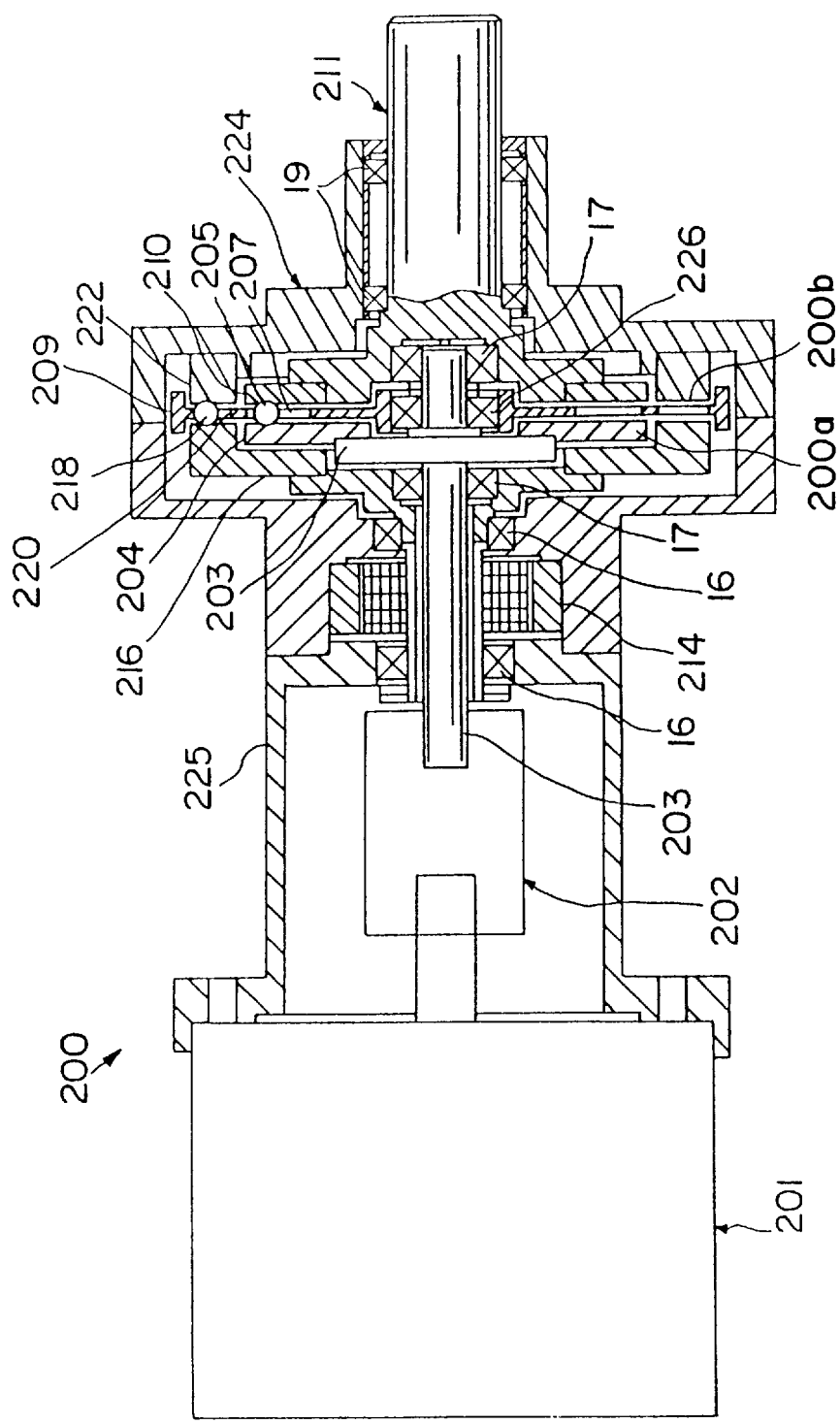
FIG. 5 is a schematic view of a preferred seamlessly-shifting, variable speed vehicular transmission according to the invention.

A preferred coaxial, in-line embodiment 200 of the invention is shown in FIG. 5, having an input drive source 201 (e.g., an electric motor) coupled via coupling 202 to primary input shaft 203 which rotates primary drive cam 204. The rotating cam 204 drives balls 205 radially in a first set of radial slots 207 of reaction disk 209, and these balls in turn drive secondary driven cam 210, which in turn rotates the output shaft 211.

A controller drive 200b controls the throughput of the primary drive unit 200a. Drive 200b includes a drive source 214 (e.g., an electric motor) which rotates control drive cam 216. The rotating cam 216 drives balls 218 radially in a second set of radial slots 220 of the same reaction disk 209, and these balls in turn are reacted by the control secondary cam 222 which is fixed to housing 224. Drive motor 201 is mounted to housing 225 which in turn is fixed to housing 224, establishing local ground.

Reaction disk 209 is rotatably mounted on a bearing 226 mounted on input shaft 203. When the control motor 214 is at rest, the reaction disk 209 is grounded via balls 218 between the grounded secondary cam 222 and the at rest primary control cam 216; the angle of attack of the balls to the primary control cam is essentially perpendicular and therefore the force from the reaction disk cannot create a rotary tangential force adequate to backdrive this assembly into the motor. The Therefore, the input rotation of primary drive cam 204 will be converted to rotation of the output secondary cam 210, at the appropriate speed reduction, because the grounded reaction disk cannot be backdriven and is fixed in space. As well, the control motor therefore does not have to react the torque on the reaction disk from rotation of the primary drive against the associated balls 205; thus no power is used to ground the reaction disk. Grounding of the reaction disk is necessary to oppose its tendency to rotate (if unconstrained) in view of the torque which it is reacting from the driven balls 205.

When the control motor is energized and begins to rotate, the reaction disk begins to rotate at the speed reduction dictated by the relationship of the control cams 216 and 222, which lessens the constraint against reaction disk rotation, since the balls associated with cams 216 and 222 begin to drive in the slots and which in turn drives the reaction disk in a rotary motion. And this direction of rotation is consistent with the tendency of the reaction disk to rotate based upon the driving of balls 205 between cams 204 and 210. Therefore the reaction disk will rotate as permitted by rotation of the control motor.

The present invention features non-backdriveable control drive 200b. Therefore the rotating control motor does not have to react the torque on the rotating reaction disk because the reaction disk is not backdriveable into the control motor, and also does not have to react the tendency of the reaction disk to rotate when the control motor is not driving. Thus modulated ground is provided to the reaction disk with a very low energy demand controller device. This enable high efficiency and low power control of the primary or main drive unit 200a.

In another embodiment of the present variable speed, the controllability of the device is used for regulation of electrical power generation. Specifically, the invention is used to keep a generator spinning at a constant speed to produce a smooth power transmission output even as the input to the system varies erratically.

Figure 6:
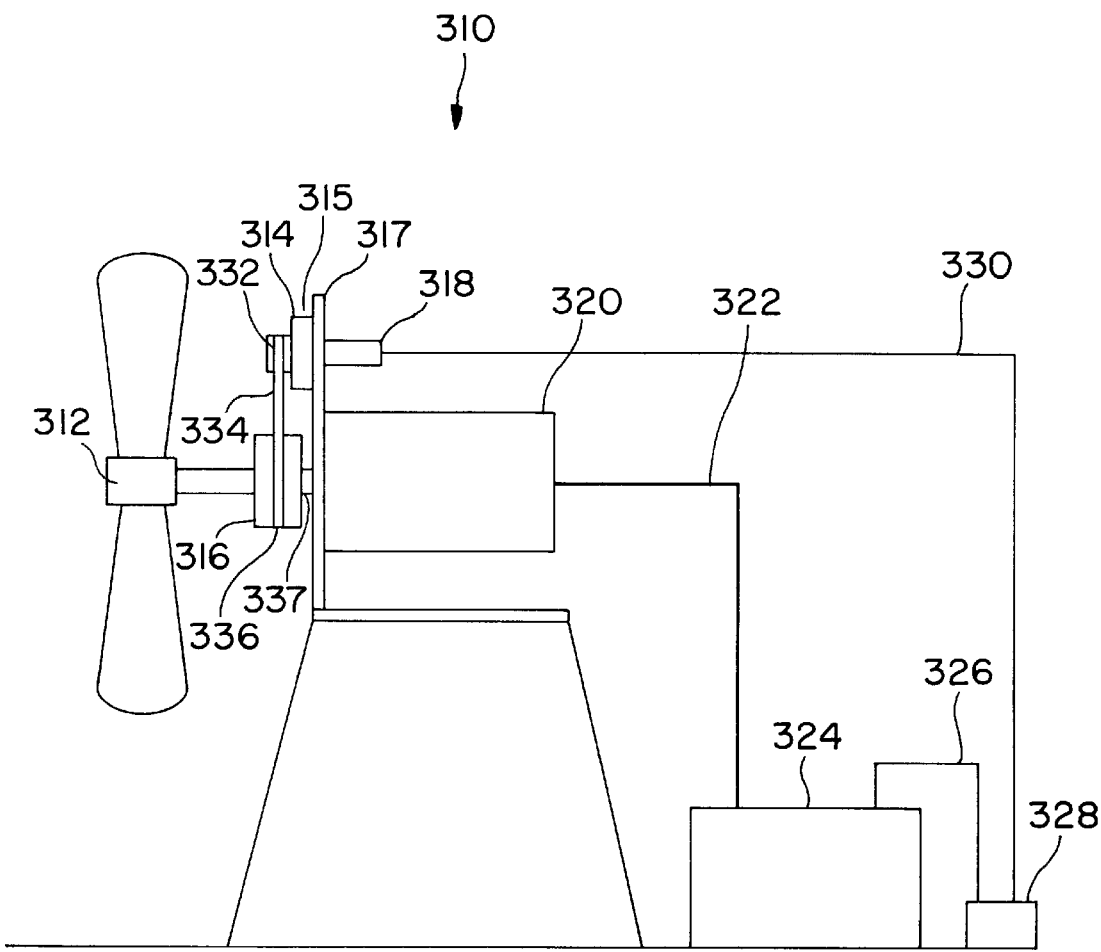
FIG. 6 is a schematic view of a power generating embodiment of the invention.

As shown in FIG. 6, power generation system 310 includes an input, for example, a wind turbine 312. Input 312 turns the shaft of the variable speed main drive unit 316 of the invention. The output of main drive 316 turns the shaft of a load, such as an AC generator 320. The power generated by the generator 320 is carried through line 322 to either a storage device or interface 324 to a power grid.

In this embodiment, a very small amount of the wind-generated power is used to control the input speeds to the generator 320. Line 326 is a tap from the generated power and runs to a conventional controller box 328 which detects power variances relative to the generator output and generates a control power signal which fed to a control motor 318 through line 330. The motor 318 is connected to controller drive unit 314 on its input shaft. The output of this drive 332 is connected by means 334, in this case a belt, to the reaction disk 336 of drive 316. The reaction disk 315 of the controller drive 314 is grounded to housing 317 to which the generator 320 is also mounted.

Modulation of the grounding of the reaction disk 336 of the primary drive unit 316 modulates the output of unit 316 as in the manner earlier discussed. This modulation is achieved by modulation of control motor 318 by controller 324 controls. In this case the output of the drive 316 is maintained at as constant a speed as practical using control motor 318, thus minimizing the ripple or variability of the electric power output of generator 320. Thus the primary drive unit 316 output speed is governed by a controller means in response to a preset paradigm and the detected speed of the primary unit's driven member 337. That paradigm may, for example, express the routine for maintaining a speed input to the AC generator 320 that results in a nearly constant 60 cycle output of the generator.

According to the above embodiments, for any constant angular velocity and rotary motive force input, the output will rotate at a constant angular velocity and rotary motive force at the converted output speed, when the retainer is fixed, or will be modulated if the retainer angular velocity and rotary motive force is modulated, according to a modulation strategy based upon the application of interest.

This invention has a multiplicity of applications, including: automotive transmissions, robotics applications, elevation drives, windmill co-generation, and the like. Various modifications of the specific embodiments set forth above are also within the spirit and scope of the invention. Nevertheless, the scope of these and other embodiments is limited only as set forth in the following claims.

What is claimed is:

1. Apparatus for converting a rotary input to a driven rotary output, the apparatus comprising housing means for defining a prime axis, a drive member for coupling to a rotary input that varies from a selected speed and a driven member for driving a driven output at said selected speed, at least one of said drive member and driven member aligned on said prime axis, transmission means for transmitting angular velocity and rotary motive force of said drive member to angular velocity and rotary motive force of said driven member, and controllable, rotary modulation means for variably grounding said transmission means to said housing means, said modulation means having control elements and defining a modulation means axis, said control elements mounted in-line along said modulation means axis and for controlledly varying said angular velocity and rotary motive force of said driven member by controlledly grounding said transmission means to said housing means for driving said driven rotary output at said selected speed, said control elements comprising at least one interacting element and at least a pair of tracks which capture said interacting element, one of said tracks being rotatable at a rate which determines said controlledly grounding.

2. The apparatus of claim 1 wherein said modulation means comprises a drive cam member for coupling to a rotary control input and a driven part for coupling to said transmission means for controlling said driven rotary output with said rotary control input, and further comprising a controller means which acts in response to a preset paradigm and to a detected speed of the driven output for controlling said rotary control member to drive said output at said selected speed.

3. The apparatus of claim 2, wherein said drive cam member comprises a face cam and said driven part comprises a face cam, and wherein said face cams are rotatable in-line about a control axis parallel to said prime axis.

4. Apparatus for converting a rotary input to a driven rotary output, the apparatus comprising housing means for defining a prime axis, a drive member for coupling to a rotary input that varies from a selected speed and a driven member for driving a driven output at said selected speed, at least one of said drive member and driven member aligned on said prime axis, transmission means for transmitting angular velocity and rotary motive force of said drive member to angular velocity and rotary motive force of said driven member, and controllable, rotary modulation means for variably grounding said transmission means to said housing means, said modulation means having control elements and defining a modulation means axis, said control elements mounted in-line along said modulation means axis and for controlledly varying said angular velocity and rotary motive force of said driven member by controlledly grounding said transmission means to said housing means for driving said driven rotary output at said selected speed, wherein said transmission means or modulation means comprises a reaction disk rotatable about said common axis, said reaction disk coupled to said drive and driven members and having at least one slot.

5. Apparatus for converting a rotary input to a driven rotary output, the apparatus comprising housing means for defining a prime axis, a drive member for coupling to a rotary input that varies from a selected speed and a driven member for driving a driven output at said selected speed, at least one of said drive member and driven member aligned on said prime axis, transmission means for transmitting angular velocity and rotary motive force of said drive member to angular velocity and rotary motive force of said driven member, and controllable, rotary modulation means for variably grounding said transmission means to said housing means, said modulation means having control elements and defining a modulation means axis, said control elements mounted in-line along said modulation means axis and for controlledly varying said angular velocity and rotary motive force of said driven member by controlledly grounding said transmission means to said housing means for driving said driven rotary output at said selected speed, wherein said driven member is coupled to a controller means for controlling the speed of the drive member in response to a chosen speed control paradigm and according to the speed of the driven member.

6. The apparatus of claim 5 wherein said reaction disk and said driven member are rotatably controlled devices, wherein said modulation means comprises a drive cam member for coupling to a rotary control input and a driven part for coupling to one of said rotatably controlled devices for controlling said driven rotary output.

7. The apparatus of claim 5 further comprising a primary drive source for rotating said drive member and wherein said modulation means comprises a control drive source for rotation of said transmission means.

8. The apparatus of claim 7 wherein said transmission means comprises at least one interacting element and a reaction disk, said reaction disk having at least one radial through-slot, wherein said through-slot centerline is defined radially by the loci of the contact of the drive cam, the driven cam, and the center of said interacting element traveling along the length of the through-slot.

9. The apparatus of claim 5 wherein said transmission means comprises at least one interacting element and a reaction disk, said reaction disk having at least one radial slot, wherein said slot centerline is defined radially by the loci of the contact of the drive cam, the driven cam, and the center of said interacting element traveling along the length of the slot.

10. The apparatus of claim 5 wherein said drive and driven members comprise a first stage and further comprising a second stage comprised of a second pair of drive and driven members, wherein the output of the first stage is coupled to the input of the second stage and the output of the second stage is for coupling to the driven output, the second stage comprising associated translating means for transmitting angular velocity and rotary motive force of said first driven member to an angular velocity and rotary motive force of said drive member of said second stage.

11. The apparatus of claim 3 wherein the drive cam member is a drive cam with at least one cycle and the driven cam member is a driven cam with a plurality of cycles, and wherein the angle G separating the slots must be greater than the angle r subtended by each of the driven cam cycles, for decreasing speed at the output, and wherein the minimum angle G is computed as $$G = \frac{360°}{\text{no. of cycles in driven cam} - \text{no. of cycles in drive cam}}.$$

12. The apparatus of claim 3 wherein the modulation means selectively grounds the rotatable reaction member to the housing means to prevent it from rotating, wherein the drive cam member is a drive cam with at least one cycle and the driven cam member is a driven cam with at least one cycle, wherein the speed ratio (SR) of the apparatus when the reaction member is not rotating is determined by comparing the inverse of the number of cycles (W) of the drive cam to the number of cycles (Z) of the driven cam, expressed as follows:

$$SR = 1/W/Z.$$

13. The apparatus of claim 5 wherein said transmission means comprises a rotatable reaction device, wherein said modulation means comprises a control device coupled to the circumference of said reaction device for varying the rotation of said reaction device.

14. The apparatus of claim 13 wherein said modulation means further comprises a capture device for capture of rotary energy of said rotating reaction device.

15. The apparatus of claim 14 wherein said reaction device is a reaction disk and wherein said capture device comprises a generator.

16. The apparatus of claim 14 further comprising means for converting rotary energy to electrical energy, wherein said control device comprises a motor and said capture device comprises a generator winding associated with said motor and a battery coupled to said means for converting.

17. The apparatus of claim of 14 wherein said control device comprises a motor and said capture device comprises a generator winding associated with said motor.

18. The apparatus of claim of 5 further comprising a second drive member for coupling to a rotary input and said second driven member for driving said driven output, second transmission means for transmitting angular velocity and rotary motive force of said second drive member to angular velocity and rotary motive force of said second driven member, second modulation means for variably and controlledly controlling said transmission means for varying said angular velocity and rotary motive force of said driven member, and a processor for controlling both of said modulation means.

19. A method for converting angular velocity and rotary motive force of an input to angular velocity and rotary motive force of an output, the method comprising the steps of:

defining a prime axis with a housing means, providing a drive member for coupling to a rotary input that varies from a selected speed and a driven member for driving a driven output at said selected speed, at least one of said drive member and driven member aligned on said prime axis, transmitting angular velocity and rotary motive force of said drive member to angular velocity and rotary motive force of said driven member via transmission means, said transmission means having a grounding member, and variably grounding said grounding member to said housing means via controllable rotary modulation means having control elements that define a modulation means axis, said control elements mounted in-line along said modulation means axis for controlledly varying said angular velocity and rotary motive force of said driven member by controlledly grounding said grounding member to said housing means for driving said driven rotary output at said selected speed, further comprising the steps of providing at least one interacting element and at least a pair of tracks, said tracks capturing said interacting element, and rotating one of said tracks at a rate which determines said controlledly grounding.

20. The method of claim 19 further comprising the steps of providing said modulation means with a drive cam member for coupling to a rotary control input and a driven part for coupling to said transmission means for controlling said driven rotary output with said rotary control input, providing a controller means which acts in response to a preset paradigm and to a detected speed of the driven output for controlling said rotary control member to drive said output at said selected speed.

21. The method of claim 20 further comprising the step of providing a slotted reaction disk in said modulation means for receiving said at least one interacting element, further comprising the step of controlling said modulation means with an irreversible control means driven by a control motor, said control means extending in the direction of said prime axis for providing a ground to said controlled devices, said irreversible means isolating said control motor from said controlled devices.

22. The apparatus of claim 1 wherein said control elements comprise a reaction disk and a driven cam member, wherein said modulation means further comprises a rotary control input and a drive cam member driven by said rotary control input, wherein one of said control elements is a driven member and controlledly grounds said transmission means to said housing means for said varying of said driven rotary output.

23. The apparatus of claim 22, wherein said drive cam member comprises a face cam and said driven cam member comprises a face cam, and wherein said face cams are in line and are rotatable about a common axis.

24. The apparatus of claim 1 wherein said at least one interacting element is a ball.

25. The apparatus of claim 8 wherein said at least one interacting element is a ball.

26. The apparatus of claim 9 wherein said at least one interacting element is a ball.

27. The method of claim 19 wherein said at least one interacting element is a ball.

28. The apparatus of claim 21 wherein said at least one interacting element is a ball.

* * * * *